US006613378B1

(12) United States Patent
Erhan et al.

(10) Patent No.: US 6,613,378 B1
(45) Date of Patent: Sep. 2, 2003

(54) SUGAR-BASED EDIBLE ADHESIVES

(75) Inventors: Selim M. Erhan, Peoria, IL (US); Sevim Z. Erhan, Peoria, IL (US); Kenneth Eskins, deceased, late of Laura, IL (US), by, Sandra Eskins, legal representative

(73) Assignee: The United States of America as represented by the Secretary of Agriculture, Washington, DC (US)

( * ) Notice: Subject to any disclaimer, the term of this patent is extended or adjusted under 35 U.S.C. 154(b) by 361 days.

(21) Appl. No.: 09/691,577

(22) Filed: Oct. 18, 2000

(51) Int. Cl.[7] ............................ A23G 3/00; C08L 3/00
(52) U.S. Cl. ................. 426/658; 106/205.1; 106/206.1
(58) Field of Search ................. 426/658; 106/205.1, 106/206.1

(56) References Cited

U.S. PATENT DOCUMENTS

| | | | | | |
|---|---|---|---|---|---|
| 4,692,478 | A | * | 9/1987 | Viswanathan et al. | 527/300 |
| 4,737,368 | A | | 4/1988 | Batterman et al. | 426/96 |
| 4,832,949 | A | * | 5/1989 | Royal | 424/73 |
| 4,842,610 | A | * | 6/1989 | Gordon et al. | 8/160 |
| 4,981,707 | A | * | 1/1991 | Morris | 426/93 |
| 5,158,765 | A | * | 10/1992 | Qasem | 424/73 |
| 5,244,112 | A | | 9/1993 | Murphy et al. | 220/706 |
| 5,819,979 | A | | 10/1998 | Murphy et al. | 220/706 |
| 5,827,553 | A | * | 10/1998 | Dimitroglou et al. | 426/89 |
| 5,895,673 | A | | 4/1999 | Keough et al. | 426/90 |
| 6,428,561 | B1 | * | 8/2002 | Johansson-Ruden et al. | 606/214 |
| 2002/0079320 | A1 | * | 6/2002 | McCarthy et al. | 220/705 |

FOREIGN PATENT DOCUMENTS

| | | | |
|---|---|---|---|
| DE | 4229392 | | 3/1994 |
| GB | 001242083 | * | 8/1971 |

OTHER PUBLICATIONS

Croutier, A. L., *Harem, The World Behind The Veil*, Abbeville Publishing Group, NY, 1989, pp. 85 and 86.

* cited by examiner

*Primary Examiner*—Nina Bhat
(74) *Attorney, Agent, or Firm*—John D. Fado; Curtis P. Ribando

(57) ABSTRACT

An edible adhesive is made by cross-linking a sugar with a polyfunctional acid. The adhesive has the property of binding two articles together for a limited period of time and then controllably releasing the adhesive bond between the articles when in contact with a liquid, such as a liquid beverage.

24 Claims, No Drawings

SUGAR-BASED EDIBLE ADHESIVES

BACKGROUND OF THE INVENTION

1. Field of the Invention

This invention relates to edible adhesives produced by cross-linking-a sugar with a polyfunctional acid. These adhesives are useful for adhering articles to food, to food packages, and to beverage containers.

2. Description of the Prior Art

Edible adhesives and adhesives generally regarded as safe (GRAS) are well known for applications wherein consumption of the adhesive or-even possible oral contact is a consideration. For example, Fischer (U.S. Pat. No. 5,851,512) teaches a sticky dental composition comprising a tackifying agent comprising carboxypolymethylene, gums, proteins, or mixtures capable of adhering and temporarily retaining a dental tray over a person's teeth. Guarino et al. (U.S. Pat. No. 4,360,551) shows a flexible film laminate especially adapted for use in the construction of a retortable food pouch for the packaging of food wherein the layers of the pouch are bonded together by an adhesive comprising a maleic acid anhydride adduct of ethylene-propylene copolymer.

Scrimager (U.S. Pat. No. 6,077,551) teaches an expandable microwave popcorn package wherein panels of the package-are bonded together by a releasable adhesive whose bonding strength will be diminished by the heat and steam generated by the popping process. Adhesives contemplated by Guarino et al. include water based vinyl acetate, water based rubber latex, water-based acrylic complexes, and water-based blends of elastomeric emulsions.

Batterman et al. (U.S. Pat. No. 4,737,368) teach sweetener compositions comprising a mixture of a mono-and di-saccharide that allows for reduced usage of food-grade acids in sucrose-sweetened foods. Among other applications, these compositions may be used for denture-retaining adhesives.

Yamamura et al. (U.S. Pat. No. 5,914,118) is drawn to a multi-layered drug containing film preparation for administration to the oral cavity, and having powdery adhesive on the side of the film opposite the drug-containing layer. The adhesive compound is one or more polyhydroxy polymer or non-toxic, pharmaceutically acceptable salts thereof, such as carboxymethylcellulose, pullulan, povidone, karaya gum, pectin, xanthan gum, tragacanth, arginic acid and gum arabic.

Keough et al. (U.S. Pat. No. 5,895,673) teaches a snack food dispensing utensil useful for picking up and delivering food to the mouth of a consumer. In one embodiment, the utensil uses a flavored adhesive material coating comprising sucrose- or fructose-based substance to prevent messy residue from being deposited on the consumer's hands. The coating is not tacky at room temperatures, but softens and becomes sticky or tacky when heated.

It is apparent from the prior art that there is a wide variety of materials and formulations that are useful as edible and/or GRAS adhesives, and that selection of a suitable adhesive is largely dependent upon the particular end use application. What is not apparent from the prior art is an edible adhesive that is designed to strongly adhere a first article to a second article for only a limited period of time, and then to controllably release the articles from one another by dissolving of the adhesive bond.

SUMMARY

We have now discovered that an edible adhesive for binding two articles together for a limited period of time and then controllably releasing the adhesive bond between the articles can be made by cross-linking a sugar with a polyfunctional acid. In a preferred embodiment of the invention, the weakening of the adhesive bond is effected by contacting the adhesive with a liquid, such as a liquid beverage.

In accordance with this discovery, it is an object of this invention to produce a food grade adhesive that quickly produces a strong, but releasable, contact bond between two articles.

It is also an object of the invention to produce an edible adhesive that firmly holds two articles together for a predetermined period of time, and then releases the adherent bond in the presence of an aqueous medium.

Another object of the invention is to produce an edible adhesive that can be readily dissolved by contact with a beverage and is not detectable by taste.

These and other objects and advantages of the invention will become readily apparent from the ensuing description.

DETAILED DESCRIPTION OF THE INVENTION

The adhesives of the invention comprise a sugar, cross-linked with a polyfunctional acid. The cross-linking is believed to be an acid-catalyzed esterification or etherification, depending on whether the functional group of the polyfunctional acid that enters into the covalent bond with the sugar hydroxyl is the acid moiety or another hydroxyl group.

The requisite cross-linking will occur with any sugar having at least two hydroxyls. The preferred sugars are disaccharides, such as sucrose, lactose, maltose and cellobiose. For most applications wherein sucrose is already present as a sweetener, sucrose would be the disaccharide of choice. Monosaccharides contemplated for use in the invention include 5- and 6-carbon aldoses and ketoses, such as glucose, galactose, fructose, mannose, arabinose, etc., with glucose and fructose usually being preferred. Polyhydroxy alcohols, such as sorbitol, can also be used.

The polyfunctional acids for use in cross-linking the sugars will most typically be organic acids falling into two main categories: polycarboxylic acids and hydroxycarboxylic acids. Typical organic acids useful in the method of the invention include citric acid, malic acid, tartaric acid, fumaric acid, glycolic acid, lactic acid and mandelic acid. In addition to the aforementioned organic acids, phosphoric acid is also useful for cross-linking the aforementioned sugars.

In the method of preparing the subject adhesives, the sugar is combined with, and preferably dissolved in, water; and then an aqueous solution of the acid is added to the aqueous sugar. The molar ratio of sugar to water in the initial reaction mixture should be within the range of 1:20 to 1:60, with a preferred ratio of about 1:30 to about 1:50, and a most preferred ratio of about 1:40. The level of acid compound in the initial reaction mixture will typically be in the range of about 5–14% by weight, with a preferred level of 8–11% by weight.

The acidified sugar mixture is heated to a boil and stirred until the desired level of cross-linking has occurred. Completion of the reaction is gaged by dropping a drop of the reaction mixture into a beaker of water. The point in the reaction at which the drop retains its shape signals that sufficient cross-linking has occurred and the reaction is complete. At this point, the reaction mixture has a temperature of approximately 128° C. and flows easily.

The hot reaction mixture is useful as an adhesive and could be directly applied to the surface or surfaces that are to be bonded together. As the reaction mixture cools, it hardens to a sticky, substantially nonflowable, mass at room temperature (25° C.). By "nonflowable" it is meant that the adhesive material cannot be poured from a beaker; and when deformed, for example with a stirring rod, will not resume its original shape within the time period of an hour. The adhesives of this invention will typically not flow until they are raised to a temperature exceeding 40° C. At 61° C., the adhesives are characterized by a Gardner Bubble Viscosity number within the range of 8.3 to 8.7, with a preferred value of 8.5. At 71° C., they are characterized by a Gardner Bubble Viscosity number within the range of 6.6 to 6.9, with a preferred value of 6.8.

Prior to use, the cooled adhesives may be reheated in any manner, such as over direct heat or in a microwave oven, to restore them to a flowable state for facile application to a surface to be bonded. A preferred temperature for applying the adhesives in a flowable state is in the range of about 85–95° C., and more preferably about 90° C. The adhesives may be reheated and cooled through several cycles without reduction of the adhesive properties, provided that care is taken not to drive off a significant amount of the bound water. For this reason, it is best not to bring the adhesive to boiling during the reheating step. The softened material may be applied to the working surface by any conventional means such as dabbing, rolling, spreading, or dripping. The material may be applied to only one, or to both surfaces to be bonded together. The bonding is immediate, without the need for clamping pressure or prolonged set time. Of course, the adherence of the two surfaces to one another will be enhanced as the adhesive cools and becomes less flowable.

The adhesives of the invention are useful for bonding a vast array of materials, including without limitation, wood, metal, coated metal, cloth, leather, glass, plastic, paper, food products and the like. They are designed to be releasable upon being weakened (e.g. dissolved) in water or other aqueous solvent. For example, the adhesive could be used to temporarily bond a novelty item to the inner surface of a beverage container during the filling stage, and then release the novelty item into the beverage after the container is sealed. See, for example, U.S. Pat. Nos. 5,819,979 and 5,244,112, both herein incorporated by reference, disclosing the need for an adhesive that will temporarily fix a buoyant member to the inner surface of a beverage container during the filling and seaming processes. Likewise, the adhesive could be used to temporarily retain a label to the inner surface of a clear liquid container until after the container is filled. For example, an adhesive bond covering an area of 0.25 cm² will dissolve in water in approximately 15–30 minutes. For some applications, it may be desirable to formulate the adhesive so as to maintain the bond for longer periods, such as for 60 to 90 minutes.

EXAMPLE 1

Adhesives Made from Sucrose Cross-linked with Various Acids

Acid (9% by weight) was dissolved in 10 moles water and added to 0.5 moles sucrose (MW=342.30) in 10 moles water in a porcelain cup. The mixture was heated over direct heat to boiling, and held at boiling until a sample drop of the reaction liquid would retain its shape when dropped into a full beaker of water. The temperature of the reaction mixture at this stage was approximately 128° C. The mixture was cooled and stored at room temperature.

To test the ability of the adhesive to bond polypropylene plastic to a lacquered aluminum surface, the adhesive was first softened in a microwave oven by heating for 20–25 seconds to a temperature of approximately 75° C. A drop of the hot adhesive was then applied with a stirring rod between the two materials, and the materials were pressed together with moderate finger pressure to spread the adhesive over a 0.25 cm² area. The adhesive was allowed to cool and gel. Its strength was subjectively evaluated by peeling the plastic and coated aluminum apart from one corner, and rating the strength of the bond as nil, very weak, weak, medium or strong.

A second sample of polypropylene plastic bonded to a lacquered aluminum surface was prepared as described above. The releasability of the adhesive was evaluated by submerging the sample in a beaker of water with the plastic surface up and the aluminum surface down. The time for the adhesive to dissolve as indicated by the plastic member floating to the surface of the water was recorded. The results are given in Table 1, below.

EXAMPLE 2

Effect of Heating and Cooling Cycles on Adhesive Properties

The resiliency of the adhesives of this invention to withstand multiple heating and cooling cycles was evaluated. A mixture of citric acid in water (15 g in 25 ml water) was added to 150 g sucrose followed by the addition of 150 ml water. The mixture was heated according to the procedure described in Example 1, and the resultant cross-linked product was divided into two beakers and allowed to cool to room temperature. One beaker was heated three times in a microwave oven for 25 seconds each time, and allowed to cool for 20 minutes to room temperature between each heating cycle. Maximum temperatures ranged from 90–97° C. The other was heated three times in a microwave oven for a preset time of 45 seconds, and allowed to cool for 20 minutes to room temperature between each heating cycle. Maximum temperatures ranged from 101–111° C. In the second and third heating cycles, boiling occurred at 35 seconds, and the heating was immediately terminated to prevent additional loss of water. Based on these trials, it was determined that the preferred temperature of reheating should not exceed about 95° C. The results are given in the last column of Table 1, below.

EXAMPLE 3

Adhesives Made from Various Sugars Cross-linked with Citric Acid

Acid (15 g) was dissolved in 25 ml water and added to 150 g sugar in a porcelain cup, followed by the addition of 150 g water. The mixture was heated over direct heat to boiling, and held at boiling until a sample drop of the reaction liquid would retain its shape when dropped into a full beaker of water. The temperature of the reaction mixture at this stage varied from about 102° C. to about 110° C. The mixture was cooled and stored in a refrigerator. The results are reported in Table 2, below.

TABLE 1

| Acid | Formula Wt. | Adhesive Strength | Dissolution Time (min) for Initial Adhesive | Dissolution time (min) for Adhesive after multiple heating/cooling cycles |
|---|---|---|---|---|
| Citric | 192.13 | strong | 30 | 30 |
| Glycolic | 76.05 | strong | 20 | 20 |
| Lactic | 90.08 | strong | 30 | 30 |
| Malic | 134.09 | strong | 30 | 20 |
| Tartaric | 150.09 | strong | 30 | 25 |
| Mandelic | 152.15 | medium | 20 | 20 |
| Fumaric | 116.07 | strong | 25 | 25 |
| Citric acid monsodium salt | | nil | n/a | n/a |
| Phosphoric | | strong | 60 | 60 |
| Hydrocholoric | | v. weak | n/a | n/a |
| Sulfuric | | v. weak | n/a | n/a |

TABLE 2

| Sugar | Temp. at boiling (° C.) | Product Color | Adhesive Strength | Dissolution Time (min) for Initial Adhesive |
|---|---|---|---|---|
| maltose | 102 | light brown | medium | 27 |
| lactose | 103 | cappicino (opaque) | weak | 20 |
| mannose | 110 | light yellow | strong | 13 |
| sucrose | 107 | dark brown | strong | 30 |
| galactose | 109 | light yellow | medium | 17 |
| sorbitol | 107 | v. light yellow | medium | 14 |
| mannitol | 108 | white crystals | n/a | n/a |
| dextrose | 109 | v. light yellow | strong | 30 |
| fructose | 106 | dark brown | med-strong | 31 |

We claim:

1. A method of producing an adhesive composition comprising:
   a. admixing sugar, water and a polyfunctional acid to form a mixture, wherein the molar ratio of sugar to water is in the range of 1:20 to 1:60 and the acid is present in the mixture in the range and the acid is present in the mixture at a level of about 5–14% by weight;
   b. heating said mixture to boiling temperature;
   c. maintaining the mixture at boiling temperature until the sugar is substantially cross-linked by the acid to yield said adhesive composition having a Gardner Bubble Viscosity number within the range of 8.3 to 8.7 at 61° C.

2. The method of claim 1, wherein said sugar is selected from the group consisting of sucrose, lactose, maltose and cellobiose, glucose, galactose, fructose, mannose, arabinose, and sorbitol.

3. The method of claim 1, wherein said sugar is sucrose.

4. The method of claim 1, wherein said polyfunctional acid is a polycarboxylic acid.

5. The method of claim 1, wherein said polyfunctional acid is a dicarboxylic acid.

6. The method of claim 1, wherein said polyfunctional acid is a hydroxy carboxylic acid.

7. The method of claim 1, wherein said polyfunctional acid is selected from the group consisting of citric, glycolic, lactic, malic, tartaric, mandelic, fumaric, and phosphoric.

8. The method of claim 1, wherein said acid is citric.

9. An adhesive composition produced by the process of claim 1.

10. An adhesive composition produced by the process of claim 2.

11. An adhesive composition produced by the process of claim 3.

12. An adhesive composition produced by the process of claim 4.

13. An adhesive composition produced by the process of claim 5.

14. An adhesive composition produced by the process of claim 6.

15. An adhesive composition produced by the process of claim 7.

16. An adhesive composition produced by the process of claim 8.

17. An adhesive composition comprising a sugar cross-linked with a polyfunctional acid.

18. The adhesive of claim 17, wherein said sugar is selected from the group consisting of sucrose, lactose, maltose, cellobiose, glucose, galactose, fructose, mannose, arabinose, and sorbitol.

19. The adhesive of claim 17, wherein said sugar is sucrose.

20. The adhesive of claim 17, wherein said polyfunctional acid is a polycarboxylic acid.

21. The adhesive of claim 17, wherein said polyfunctional acid is a dicarboxylic acid.

22. The adhesive of claim 17, wherein said polyfunctional acid is a hydroxy carboxylic acid.

23. The adhesive of claim 17, wherein said polyfunctional acid is selected from the group consisting of citric, glycolic, lactic, malic, tartaric, mandelic, fumaric, and phosphoric.

24. The adhesive of claim 17, wherein said polyfunctional acid is citric.

* * * * *